US006715059B2

(12) United States Patent
Miller

(10) Patent No.: US 6,715,059 B2
(45) Date of Patent: Mar. 30, 2004

(54) METHODS AND SYSTEMS FOR A SHARED MEMORY UNIT WITH EXTENDABLE FUNCTIONS

(75) Inventor: Chris D. Miller, Austin, TX (US)

(73) Assignee: TAS Holdings, Inc., Austin, TX (US)

(*) Notice: Subject to any disclaimer, the term of this patent is extended or adjusted under 35 U.S.C. 154(b) by 161 days.

(21) Appl. No.: 09/912,898

(22) Filed: Jul. 25, 2001

(65) Prior Publication Data

US 2002/0016900 A1 Feb. 7, 2002

Related U.S. Application Data

(60) Provisional application No. 60/220,974, filed on Jul. 26, 2000, and provisional application No. 60/220,748, filed on Jul. 26, 2000.

(51) Int. Cl.[7] .............................................. G06F 12/00
(52) U.S. Cl. ........................ 711/220; 711/147; 711/148; 711/150; 711/154; 711/168; 709/213; 709/214
(58) Field of Search ................................ 711/220, 146, 711/150, 151, 154, 163, 168, 147–148; 709/213–214

(56) References Cited

U.S. PATENT DOCUMENTS

| 4,486,834 | A | | 12/1984 | Kobayashi et al. | ......... | 711/148 |
|---|---|---|---|---|---|---|
| 5,568,609 | A | | 10/1996 | Sugiyama et al. | ............ | 714/43 |
| 5,604,882 | A | | 2/1997 | Hoover et al. | | |
| 5,649,092 | A | * | 7/1997 | Price et al. | .................... | 714/15 |
| 5,668,943 | A | | 9/1997 | Attanasio | | |
| 5,765,157 | A | | 6/1998 | Lindholm et al. | | |
| 5,983,326 | A | * | 11/1999 | Hagersten et al. | ........... | 711/147 |
| 6,092,166 | A | * | 7/2000 | Bobak et al. | ................ | 711/169 |
| 6,108,757 | A | * | 8/2000 | Arshad | ........................ | 711/152 |
| 6,173,375 | B1 | * | 1/2001 | Arshad | ........................ | 711/152 |
| 6,385,658 | B2 | * | 5/2002 | Harter et al. | ................ | 709/312 |
| 6,427,195 | B1 | | 7/2002 | McGowen et al. | | |

FOREIGN PATENT DOCUMENTS

EP 0 602 791 A2 6/1994 ........... G06F/15/16

OTHER PUBLICATIONS

International Search Report for PCT/US02/23171 dated Mar. 3, 2003.
International Search Report dated Jul. 16, 2002.

(List continued on next page.)

*Primary Examiner*—Mano Padmanabhan
*Assistant Examiner*—Jasmine Song
(74) *Attorney, Agent, or Firm*—Gray Cary Ware & Freidenrich, LLP

(57) ABSTRACT

Systems and methods are described for an enhanced shared memory unit. Embodiments of methods presented may include permitting a plurality of central processing units to simultaneously read data stored in a first shared memory address. This first shared memory address being accessed by a first central processing unit. These methods may then include receiving a request to read the first shared memory address from a second central processing unit, and receiving a request to read the first shared memory address from a third central processing unit. Furthermore, these methods may then encompass determining a relationship between data stored in the first shared memory address and data stored in a second shared memory address, and determining a relationship between data stored in the first shared memory address and data stored in a third shared memory address. Many of the methods presented also include transforming the data stored in the second shared memory address to a form equivalent to that of the data stored in the first shared memory address, and transforming the data stored in the third shared memory address to a form equivalent to that of the data stored in the first shared memory address. These same methods may also include permitting the second central processing unit to access data stored in the second shared memory address, and permitting the third central processing unit to access data stored in the third shared memory address.

8 Claims, 4 Drawing Sheets

ATOMIC INCREMENT AND DECREMENT OF A MEMORY OBJECT

OTHER PUBLICATIONS

International Search Report mailed Jun. 5, 2002.

Bershad, et al., "The Midway Distributed Shared Memory System" Compcon Digest of Papers, pp. 528–537, Feb. 22, 1993.

Wilson, et al. "Hardware Assist for Distributed Shared Memory" Proceedings of the International Conference on Distributed Computing Systems, pp. 246–255, May 25, 1993.

Songnian, et al. "Heterogeneous Distributed Shared Memory," IEEE Transactions on Parallel and Distributed Systems, vol. 3, No. 5, pp. 540–554, Sep. 1, 1992.

Nitzberg, et al. "Distributed Shared Memory: A Survey of Issues and Algorithms," IEEE Computer Society, pp. 52–60, Aug. 1, 1991.

Stumm, et al. "Algorithms Implementing Distributed Shared Memory," IEEE Computer Society, pp. 54–64, May 1, 1990.

Ananthanarayanan, et al. "Experiences in Integrating Distributed Shared Memory with Virtual Memory Management," Operating Systems Review, vol. 26, No. 3, pp. 4–26, Jul. 1, 1992.

Bisiani, et al., Plus: A Distributed Shared–Memory System, Proceedings of the Annual International Symposium on Computer Architecture, pp. 115–124, May 28, 1990.

Levelt, "A Comparison of Two Paradigms for Distributed Shared Memory," Software Practice & Experience, vol. 22, No. 11, pp. 985–1010, Nov. 1, 1992.

Ramachandran, et al. "Programming with Distributed Shared Memory," Proceedings of the Annual International Computer Software and Applications Conference, vol. Conf. 13, pp. 176–183, Sep. 20, 1989.

* cited by examiner

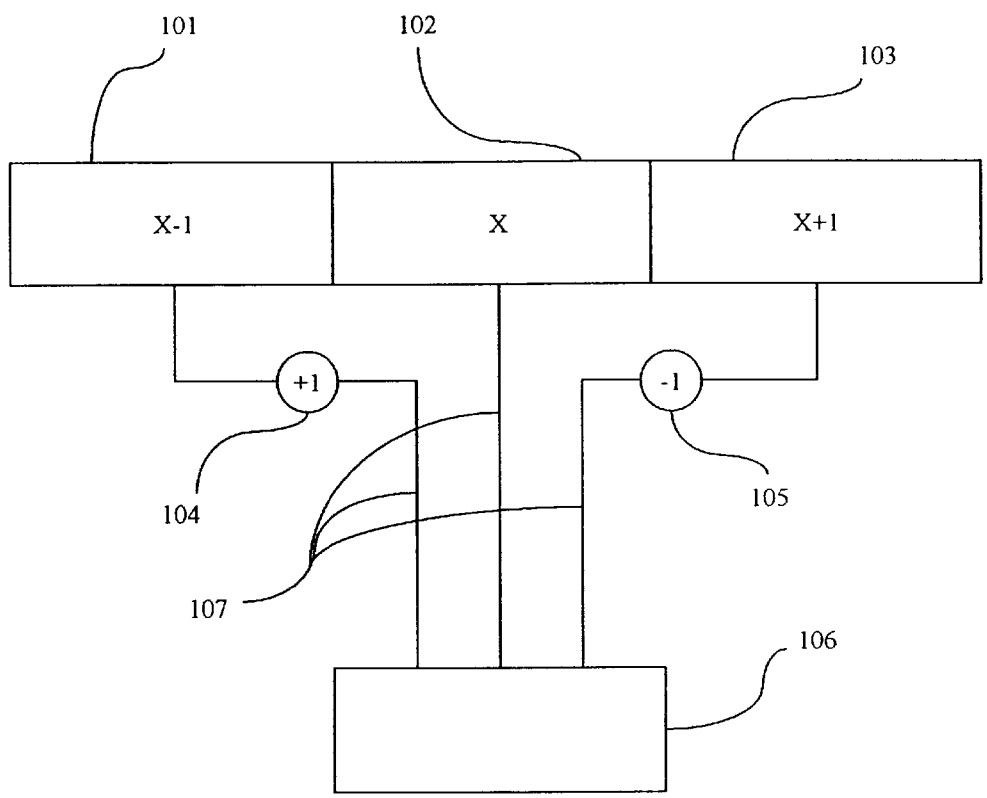
FIG. 1 ATOMIC INCREMENT AND DECREMENT OF A MEMORY OBJECT

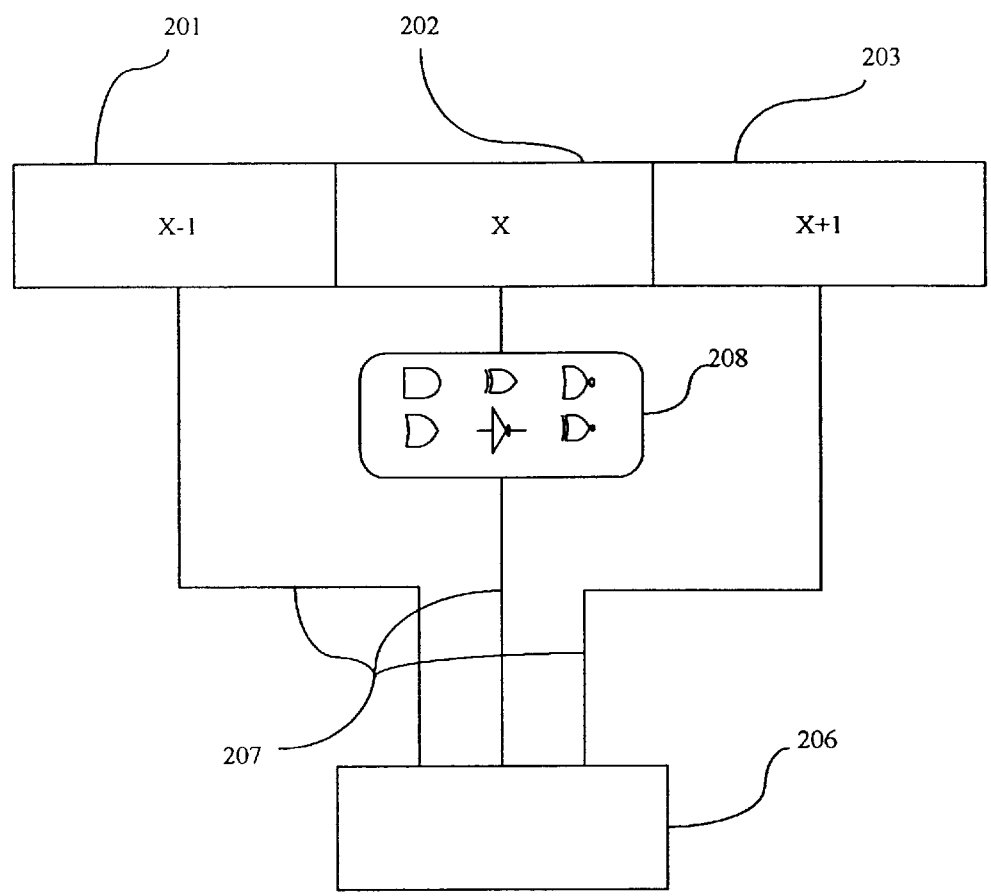
FIG. 2 BIT MANIPULATION WITHIN A MEMORY OBJECT

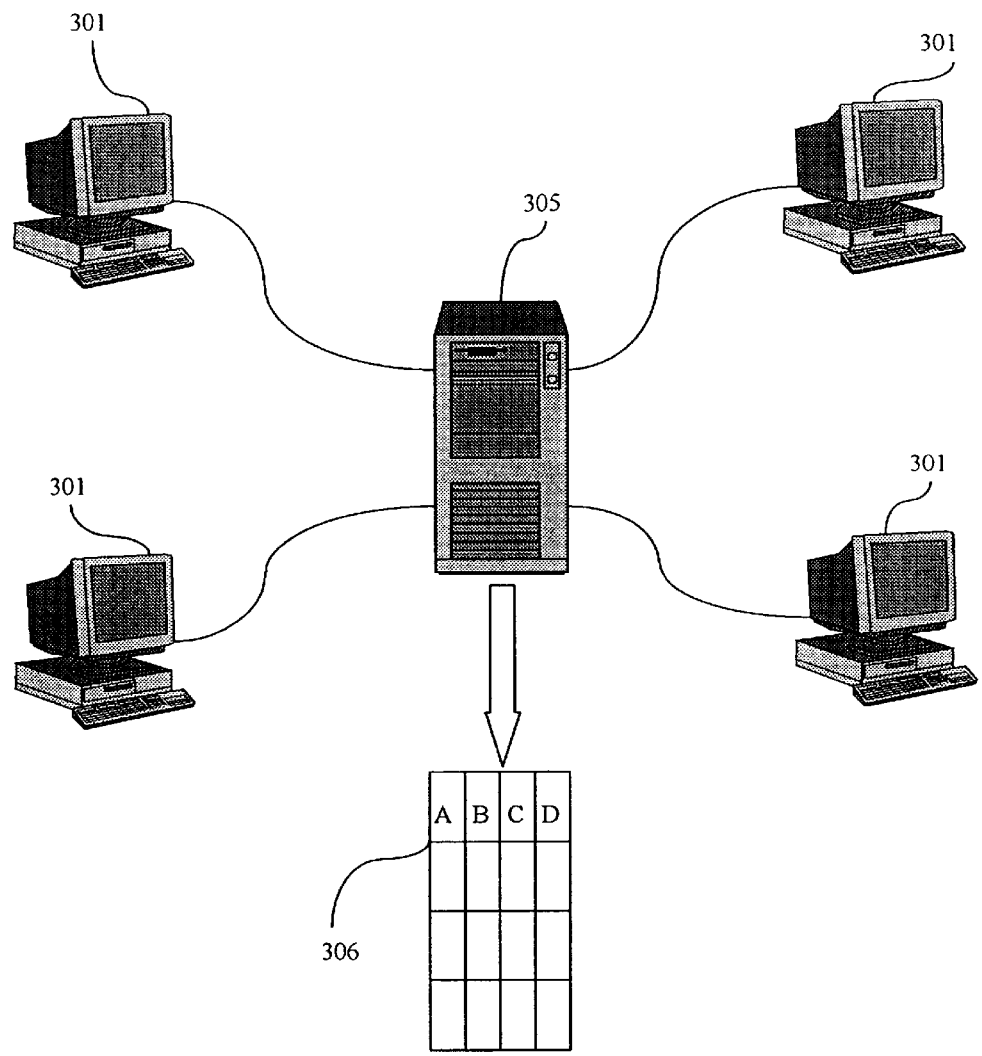
FIG. 3 BLOCK MEMORY MOVE AND INITIALIZATION OPERATIONS

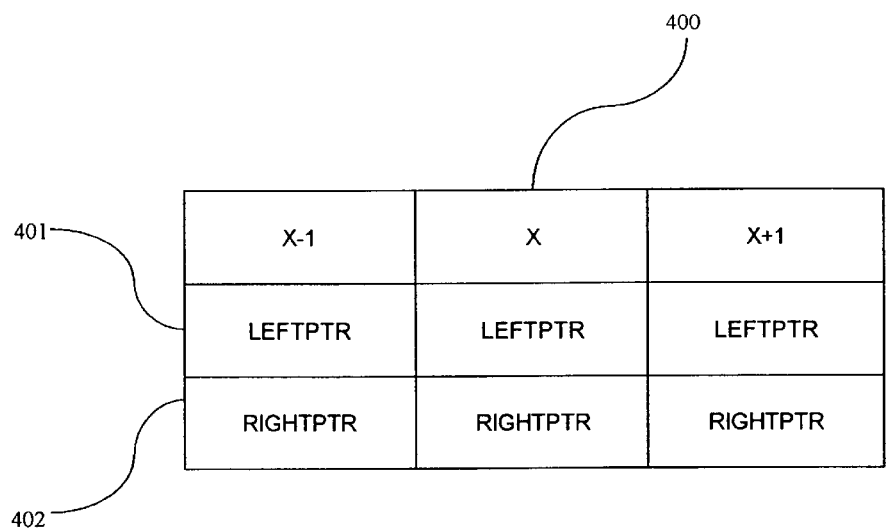
FIG. 4 A DOUBLY LINKED LIST

METHODS AND SYSTEMS FOR A SHARED MEMORY UNIT WITH EXTENDABLE FUNCTIONS

CROSS-REFERENCES TO RELATED APPLICATIONS

This application is a continuation-in-part of, and claims a benefit of priority under 35 U.S.C. 119(e) and/or 35 U.S.C. 120 from, copending U.S. Ser. No. 60/220,974, filed Jul. 26, 2000, and 60/220,748, also filed Jul. 26, 2000, the entire contents of both of which are hereby expressly incorporated by reference for all purposes.

BACKGROUND OF THE INVENTION

1. Field of the Invention

The invention relates generally to the field of multiprocessor parallel processing systems. More particularly, the invention relates to multiprocessor parallel processing systems configured with globally accessible shared memory apparatus.

2. Discussion of the Related Art

A shared memory unit is made up in two general areas as an atomic complex and a shared memory area." The atomic complex is further subdivided into a lock complex, doorbell complex, and miscellaneous area.

The lock complex is merely an array of shared memory unit memory locations that provide a "test and set" like operation on a 32 bit object or memory word. When the shared memory unit receives a read request for one of these objects it returns the data to the requester. In addition, if the least significant bit (LSB) of the data is a binary 0 the shared memory unit sets the LSB to a 1 in its copy of the data. Thus any future reads of this object will return a 1 in the LSB of the data. If the LSB is already a 1 then the shared memory unit just returns the data and does nothing to its copy. When a requester sees that the data returned has the LSB cleared or 0 it can assume any future reads, by other hosts attached to the shared memory unit, will return a 1 in the LSB thus creating an element with "test and set" locking heuristics. The LSB stays set until the first reader, the one that read the element where the LSB was 0, writes a binary 0 back to the element thus clearing this test and set lock.

With this primitive the shared memory area of the shared memory unit can be broken up into many pieces that can each be accessed atomically by team members as long as they acquire a lock prior to accessing each area. For example, in shared memory there can be a doubly linked list of widget structures. Widget structures are added to the list by some team members and removed by others. Since each team member is running asynchronously with respect to each other and they all have access to this list the team must be very careful when changing the list. Only one team member may change the list at a time. This is accomplished by acquiring the lock above, modifying the list and releasing the lock when the list is updated. When one team member owns the lock all other team members that want the lock must wait. These waiting team members are usually in a state where they can do nothing else until it is their turn to update the list, thus wasting valuable CPU cycles. As the number of team members increase, the lock contention increases geometrically to a point where adding team members to the team no longer adds to the performance of the team.

The present invention overcomes the above limitation and others by describing methods and apparatus wherein a shared memory unit can be used to eliminate the above discussed problems in the prior art. In addition, methods for dynamically expanding the capabilities of a shared memory unit to deliver various functions are disclosed.

SUMMARY OF THE INVENTION

There is a need for the following embodiments. Of course, the invention is not limited to these embodiments.

According to an aspect of the invention, a method comprises: permitting a plurality of central processing units to simultaneously read data stored in a first shared memory address, the first shared memory address being accessed by a first central processing unit; receiving a request to read the first shared memory address from a second central processing unit; receiving a request to read the first shared memory address from a third central processing unit; determining a relationship between data stored in the first shared memory address and data stored in a second shared memory address; determining a relationship between data stored in the first shared memory address and data stored in a third shared memory address; transforming the data stored in the second shared memory address to a form equivalent to that of the data stored in the first shared memory address; transforming the data stored in the third shared memory address to a form equivalent to that of the data stored in the first shared memory address; permitting the second central processing unit to access data stored in the second shared memory address; and permitting the third central processing unit to access data stored in the third shared memory address. According to another aspect of the invention, a method, comprises: providing a queue of activity to a central processing unit, the queue of activity residing in the shared memory unit; receiving a request from a central processing unit via the queue of activity to move a block of shared memory, the block of shared memory residing in the shared memory unit; moving the block of shared memory as desired by the central processing unit; and notifying the central processing unit upon completion of the move of the block of shared memory. According to another aspect of the invention, a method, comprises: providing a queue of activity to a central processing unit, the queue of activity residing in the shared memory unit; receiving a request from a central processing unit via the queue of activity to update data stored in a shared memory address, the request including an old value and a new value; if the old value received from the central processing unit matches a data stored in the shared memory address, updating the data stored in the shared memory address to the new value; and then notifying the central processing unit of a successful update of the data stored in the shared memory address to the new value. According to another aspect of the invention, a method, comprises permitting a shared memory unit to control a plurality of central processing units attempting to traverse a data structure stored in the shared memory unit. According to another aspect of the invention, an apparatus comprises: a central processing unit; and a shared memory unit coupled to the central processing unit, the shared memory unit including a data structure and a queue of activity documenting shared memory accesses by the central processing unit of the shared memory unit.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

FIG. 1 illustrates a block diagram of a shared memory unit, representing an embodiment of the invention.

FIG. 2 illustrates a block diagram of a shared memory unit, representing an embodiment of the invention.

FIG. 3 illustrates a schematic view of a parallel processing system, representing an embodiment of the invention.

FIG. 4 illustrates a schematic view of a data structure, representing an embodiment of the invention.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patent Applications disclose embodiments that were satisfactory for the purposes for which they are intended. The entire contents of U.S. Ser. Nos. 09/273,430, filed Mar. 19, 1999; 09/859,193, filed May 15, 2001; 09/854,351, filed May 10, 2001; 09/672,090, filed Sep. 28, 2000; 09/653,189, filed Aug. 31, 2000; 09/652,815, filed Aug. 31, 2000; 09/653,183, filed Aug. 31, 2000; 09/653,425, filed Aug. 31, 2000; 09/653,421, filed Aug. 31, 2000; 09/653,557, filed Aug. 31, 2000; 09/653,475, filed Aug. 31, 2000; 09/653,429, filed Aug. 31, 2000; 09/653,502 filed Aug. 21, 2000; 09/912,954, filed Jul. 25, 2001; 09/912,833, filed Jul. 25, 2001; 09/912,834, filed Jul. 25, 2001; 09/912,872, filed Jul. 25, 2001; 09/912,872, filed Jul. 25, 2001; 09/915,109, filed Jul. 25, 2001; 09/912,856, filed Jul. 25, 2001; 09/915,002, filed Jul. 25, 2001; 09/912,870 filed Jul. 25, 2001 are hereby expressly incorporated by reference herein for all purposes.

The context of the invention can include a shared memory unit capable of independently generating and executing various processes. The context of the invention can also include methods and apparatus to maximize efficiency in multiprocessor parallel processing systems.

The present invention builds on the capabilities of the apparatus and embodiments described in the patent application "Shared Memory Apparatus and Method For Multiprocessor Systems" U.S. Ser. No. 09/273,430, filed Mar. 19, 1999. As CPU processing speeds continue to increase at a faster rate than connection bus and link media speeds, the effective distance between a CPU and a shared memory unit is becoming larger, causing the host CPU to stall and wait on data being written to and retrieved from the shared memory unit. The invention presents methods and apparatus to regain or reduce the time wasted by the CPU due to waiting for shared memory unit access. This list is not an exhaustive one and those trained in the art should see more methods than are presented herein. Some of these enhancements are, but not limited to, atomic list management, atomic bit operations, compare and exchange primitives, memory primitives that include movement of blocks of memory and initialization functions. The invention also discloses the idea of dynamically downloading functions from a host or team CPU to the shared memory unit to dynamically add new functions and/or atomic primitives.

There are many operations in modern multi-computer systems that must be done atomically. It is important that these atomic operations be done in a way that does not have an effect or cause processors in the atomic complex to stall or wait. In addition, as processor speeds increase and I/O units become more distant with respect to the number of CPU cycles to access these I/O units, these atomic operations should be held to a minimum of I/O operations that must traverse the plurality of hardware connections between the sending and receiving systems. This is even more critical in a shared memory unit style system because of the need for an acknowledgement response from the receiving system hardware back to the sending systems hardware. This hardware acknowledgement response effectively doubles the number of hardware interconnects and bus cycles for each shared memory unit I/O operation.

There are many atomic operations that can be implemented by a shared memory unit in such a way as to not cause the team members sharing the shared memory unit to stall. Following are a few of the most used atomic operations. Again this is not an exhaustive list and others should be obvious to those skilled in the art. Along with the operation is an embodiment of the operation. Again it is only one of many possible embodiments.

An atomic operation that can be used to greatly reduce contention for access to shared memory spaces is atomic increment and decrement of a memory object. The simplest embodiment of this operation is three separate addresses that overlay each other. The first address space is the increment space, called the I-space; reads to this area cause the underlying datum to be incremented by 1 before being returned to the requester. The second address space, called the D-space, is the decrement address space where the datum is decreased by 1 prior to the datum being returned to the requester. Finally, the third address space is the query address space, named Q-space, where a read of the object causes the datum to be returned to the requester without the side effect of either increment or decrease. In this embodiment, each datum can be accessed via three different addresses, one address causes an increment, a second address causes a decrement, and a third address just returns the value of the datum.

Referring to FIG. 1, a block diagram representing atomic increment and decrement of a memory object is shown. A shared memory address X 102 and two adjacent memory addresses X−1 101 and X+1 103 are shown. The memory address X 102 is coupled to a shared memory unit interface 106 via an interconnect 107. The memory address X 102 can also be referred to as the Q-space. Memory address X−1 101 is coupled to an auto-increment logic 104. The auto-increment logic 104 is coupled to the shared memory unit interface 106 via an interconnect 107. The memory address X−1 101 can also be referred to as the I-space. Memory address X+1 103 is coupled to an auto-decrement logic 105. The auto-decrement logic 105 is coupled to the shared memory unit interface 106 via an interconnect 107. The memory address X+1 103 can also be referred to as the D-space.

Still referring to FIG. 1, when a member CPU in a multiprocessor parallel processing system requests a read to memory address X 102, if no other member CPU is already accessing memory address X 102, a shared memory unit grants the requesting member CPU a direct read to the memory address X 102 via an interconnect 107 and a shared memory unit interface 106, via which the shared memory unit communicates with member CPUs. If another member CPU is already accessing the data in memory address X 102, the shared memory unit can grant a read to the data stored in memory address X 102 by first granting the requesting member CPU access to memory address X−1 101 and then auto-incrementing the datum stored in memory address X−1 101 via auto-increment logic 104, and then returning the datum via the shared memory interface 106 and the interconnect 107. If another member CPU is already accessing the data in memory address X−1 101, the shared memory unit can grant a read to the data stored in memory address X 102 by first granting the requesting member CPU access to memory address X+1 103, and then auto-decrementing the datum stored in memory address X+1 103 via auto-decrement logic 105, and then returning the datum via the shared memory interface 106 and the interconnect 107.

In another embodiment of the invention, a shared memory unit can be used to atomically update data stored in shared memory addresses by performing logical operations on the data stored in the shared memory addresses. Some manipulations include, but are not limited to, a logical inclusive or operation, a logical and operation, a logical exclusive or operation, and a one's compliment operation. These operations are inherently read-modify-write operations. In this embodiment of the invention, multiple address spaces are overlaid similarly to the atomic increment decrement embodiment address spaces. The first address is the read-modify-write address space, called the RMW-space, the second address space is the read address space, called the R-space, and finally the third address space is the Write address space, called the W-space. The shared memory unit has knowledge of the requester for any particular datum. In the case of a read request to the RMW-space the shared memory unit must ensure that there are no other access outstanding to the datum from either the W-space or the R-space. If so, the read of the RMW-space must be held off until the previous request is complete. Once the previous request is complete, the read of the RMW-space can be completed returning the current value of the datum to the requesting team member. In addition, no other request will be honored until a write is done to the datum from the team member that did the read of the RMW-space for this datum. Thus the datum is updated automatically with respect to each team member.

Referring to FIG. 2, a shared memory unit capable of bit manipulation within a memory object is shown. Shared memory address X 202 and two adjacent shared memory addresses X−1 201 and X+1 203 are shown. Shared memory address X 202 can also be referred to as the Read-Modify-Write (RMW) space. The shared memory unit is capable of carrying out logical operations on the data stored in the shared memory address X 202 via a logic operation control 208. The memory addresses 201, 202, and 203 are coupled to a shared memory unit interface 206 via an interconnect 207.

Still referring to FIG. 2, member CPUs requesting to read the datum in shared memory address X 202 can do so by the methods discussed above. However, when a member CPU instructs the shared memory unit to implement a logical operation on the data stored in shared memory address X 202, all other accesses to the data through shared memory addresses X−1 201 and X+1 203 are suspended. Once the logical operation is completed through a logic operation control 208, normal operation of the shared memory unit continues, and member CPUs can access the newly updated memory from either shared memory address X−1, X, or X+1 201, 202, and 203 via the shared memory unit interface 206.

The invention also facilitates block memory move and initialization operations. As memory within a shared memory unit is allocated, copied, and deallocated by team members the team members must do multiple I/O requests to initialize it, copy it, and clean it up before deallocation or freeing the shared memory. The shared memory unit can do this much more effectively and it has the effect of reducing traffic on the hardware busses that connect the team member processors and the shared memory unit. The invention includes an operation that writes binary zeroes into a block of shared memory. In this embodiment of the invention a simple queue is provided by the shared memory unit to each team member. After the team member has allocated a block of memory from the shared memory area it places a command in its queue on the shared memory unit that directs the shared memory unit to write zeroes into the shared memory indicated by a field in the queue. When the shared memory unit has completed the write it will interrupt the team member or update a completion flag in the queue so that the team member knows the block of memory has been initialized.

Referring to FIG. 3, a shared memory unit configured to facilitate block memory move and initialization operations is shown. Member CPUs 301 are coupled to a shared memory unit 305 via buses. The shared memory unit 305 maintains a list 306 of each member CPUs 301 access to data stored in the shared memory unit. The list 306 is organized according to each member CPUs 301 ID. Hence, the shared memory unit 305 has an account of the state of each member CPUs 301 shared memory activity.

A further operation of this type is a memory move within a shared memory unit. Using a queue provided to a team member by the shared memory unit the team member provides the source starting address, the destination starting address, and a length to move. Again the shared memory unit can interrupt the team member or set a complete flag in the queue to indicate completion of the requested operation.

Another type of memory operation the invention is capable of is a compare and exchange operation. Using a team member's private queue, the team member provides an old value, a new value, and an address within a shared memory unit. The shared memory unit checks the data at the address and if it matches the given old value provided by the team member the new value if placed at that address and a success or failure flag is placed in the operation queue of the team member.

The last set of memory operations described herein is a set of list management operations. In large scale systems there are many lists of various structures of information. These lists come in primarily two flavors; there are others not mentioned here and should be obvious to one skilled in the art, singly and doubly linked lists. When these lists are shared by multiple team members a lock must be acquired by any team member wanting to touch the list. This implies just traversing or reading the list requires the lock to be held. The lock must be acquired in order to protect the integrity of a list while a team member traverses the list, even if just reading. The invention can present operations that atomically remove and add objects to a list thus removing the requirement for a lock to protect the list. The list is described to a shared memory unit indicating singly or doubly linked list and a sorting order. The sorting order describes how the list is to be maintained and how the shared memory unit inserts a new object to the list. Add operations are insert at the head of the list, insert at the tail of the list, or insert in a sorted order based on which field the object is being inserted into. Conversely a set of functions to remove an object from the list must exist. Remove operations are remove from the head of the list, remove from the tail of the list, or remove from the middle of the list. In the last case the shared memory unit is given an address of the object to be removed. The shared memory unit then sets a flag in the team member's operation queue to indicate completion. In order for these operations to be done atomically, the shared memory unit must maintain the state on which team members are working with each object or element in the list. The final two shared memory unit operations in this group are a get object and a done-with or give-back object interface. A team member traverses the list by doing pairs of get and done-with object operations. The shared memory unit maintains a bit mask of team members that actively hold a pointer to an object. Thus, when a remove object operation is issued by a team member the shared memory unit ensures the object can be atomically removed from the list, i.e., when no other team member holds an object that references the object to be moved. Conversely, an atomic insertion is done by the shared memory unit when no team member is actively holding an object that must be modified on either side of the insertion point. There are other ancillary operations that the shared memory unit can do such as return the current member of objects in a list, and statistics on how many insertions, removals, and accesses have been done to the list. These and others would be obvious to those skilled in the art.

The list insertion, removal, and get/done-with operations can be implemented as mail box types of operations or as address space overlays. Classically, in a doubly linked list, each object holds a pointer to the next and previous object. In this case a shared memory unit would implement the list management operations as mail box operations. However, if the shared memory unit maintained opaque pointers to the next and/or previous a very fast address space method could be used. It would work similarly to the overlays mentioned above where an array of shared memory unit addresses represent the list. A read of an address is a get object operation, the data returned is a pointer to the object, a write to a compliment address is a done-with operation, the data written is the pointer returned by the get operation done earlier. Separate arrays of address spaces are maintained for insert and remove operations. This method could have the effect of limiting the size of or the number of lists due to address space constraints.

Referring to FIG. 4, a doubly linked list is shown. Three adjacent shared memory addresses X−1, X, and X+1 400 are shown. For each shared memory address, the doubly linked list contains a LEFTPTR 401 which points to the shared memory address that comes before a current entry in the doubly linked list and a RIGHTPTR 402 which points to the shared memory address that comes after the current entry in the doubly linked list. The invention enables a shared memory unit to independently detect the LEFTPTR 401 and the RIGHTPTR 402, thus reducing the use of I/O buses carrying information to and from the shared memory unit.

One last embodiment of these list management operations is fixed addresses for list management operations. In this method each list maintained by a shared memory unit has a set fixed address for a get operation, where a pointer to the object is returned. The shared memory unit captures the team member's ID and still maintains a bit mask of what objects are currently in use by which team member(s). There is an address for the done-with operation where a write indicates that an object is being released and the data written points to the object being released. There is an address for insert at head, insert at tail, insert in order, remove from head, remove from tail, and remove from middle. Other operations are get-head, get-tail, get-next, get-previous, done-with-previous, done-with-next, and others not mentioned here. These next operations imply a release of the last object and an acquire of the next further reducing shared memory unit bus traffic.

Thus, a list traversal becomes get-head, get-next, get-next, instead of a series of get/done-with operations. Using get-next effectively reduces the number of shared memory unit bus crossings by 50 percent. These operations allow the team members to manipulate shared lists without having to acquire a lock. In addition, operations can be done with one or two I/O requests to the shared memory unit thereby reducing the traffic on the I/O busses and improving the overall effectiveness of the system.

Finally, for shared memory units that are backed or implemented with a microprocessor as the controlling engine, new operations can be downloaded from a team member or from persistent storage to add to the current set of shared memory unit operations or enhance embedded shared memory unit operations. These operations are started by commands passed to the shared memory unit through a command queue. The team member places the new operation instructions in the shared memory unit memory and via a command tells the shared memory unit core engine where it is and other details that allow the shared memory unit core engine to place the new instructions into operation. The instruction format and details thereof would be dependent on the type and implementation of the shared memory unit core engine.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

While not being limited to any particular performance indicator or diagnostic identifier, preferred embodiments of the invention can be identified one at a time by testing for the absence of CPU idle time. The test for the absence of CPU idle time can be carried out without undue experimentation by the use of a simple and conventional CPU usage monitoring experiment.

Practical Applications of the Invention

A practical application of the invention that has value within the technological arts is in shared memory, multiple CPU parallel processing systems. Further, the invention is useful in conjunction with network storage systems (such as are used for the purpose of Internet servers), or the like. There are virtually innumerable uses for the invention, all of which need not be detailed here.

Advantages of the Invention

An enhanced shared memory unit, representing an embodiment of the invention, can be cost effective and advantageous for at least the following reasons. The invention improves quality and/or reduces costs compared to previous approaches. Threads requiring access to protected shared resources can be executed efficiently by utilizing the features of the invention. CPUs no longer have to wait long periods of time to acquire access to protected shared resources Thus the invention greatly increases overall computer system performance by reducing CPU idle time.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein.

Further, although the shared memory unit described herein can be a separate module, it will be manifest that the shared memory unit may be integrated into the computer system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
    permitting a plurality of central processing units to simultaneously read data stored in a first shared memory address, the first shared memory address being accessed by a first central processing unit;
    receiving a request to read the first shared memory address from a second central processing unit;
    receiving a request to read the first shared memory address from a third central processing unit;
    determining a relationship between data stored in the first shared memory address and data stored in a second shared memory address;
    determining a relationship between data stored in the first shared memory address and data stored in a third shared memory address;
    transforming the data stored in the second shared memory address to a form equivalent to that of the data stored in the first shared memory address;
    transforming the data stored in the third shared memory address to a form equivalent to that of the data stored in the first shared memory address;
    permitting the second central processing unit to access data stored in the second shared memory address; and
    permitting the third central processing unit to access data stored in the third shared memory address.

2. The method of claim 1, wherein the data stored in the second shared memory address is transformed via an arithmetic operation.

3. The method of claim 1, wherein the data stored in the third shared memory address is transformed via an arithmetic operation.

4. The method of claim 1, further comprising monitoring access of the first shared memory address by the plurality of central processing units.

5. The method of claim 1, further comprising atomically updating the data stored in the first shared memory address.

6. The method of claim 5, further comprising temporarily suspending access to the shared memory address while the data stored in the first shared memory address is being updated.

7. The method of claim 5, further comprising temporarily suspending access to the third shared memory address while the data stored in the first shared memory address is being updated.

8. The method of claim 5, wherein data stored in the first shared memory address is updated via logical operations.

* * * * *